US008608891B2

(12) United States Patent
Ayliffe et al.

(10) Patent No.: US 8,608,891 B2

(45) **Date of Patent: *Dec. 17, 2013**

(54) METHOD FOR MANUFACTURING A MICROFLUIDIC SENSOR

(75) Inventors: Harold E. Ayliffe, Woodinville, WA (US); Curtis S. King, Kirkland, WA (US)

(73) Assignee: EI Spectra, LLC, Hailey, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,485

(22) Filed: May 17, 2012

(65) Prior Publication Data

US 2012/0261067 A1 Oct. 18, 2012

Related U.S. Application Data

(63) Continuation of application No. 12/936,243, filed as application No. PCT/US2009/002172 on Apr. 7, 2009, now Pat. No. 8,182,635.

(60) Provisional application No. 61/123,248, filed on Apr. 7, 2008, provisional application No. 61/124,121, filed on Apr. 14, 2008.

(51) Int. Cl.

| | |
|---|---|
| ***B29C 65/48*** | (2006.01) |
| ***B32B 37/00*** | (2006.01) |
| ***B32B 38/10*** | (2006.01) |
| ***B32B 38/14*** | (2006.01) |
| ***B32B 27/00*** | (2006.01) |

(52) U.S. Cl.

USPC ............ 156/252; 156/256; 156/277; 156/278

(58) Field of Classification Search

USPC .......... 156/250, 252, 256, 277, 278; 324/434, 324/425, 439, 71.1, 692, 722; 204/400, 204/402, 406, 415; 205/778, 781.5; 422/44, 422/56, 61, 67, 82.01, 82.02; 436/16, 63, 436/66, 68, 178

See application file for complete search history.

(56) References Cited

U.S. PATENT DOCUMENTS

| | | | |
|---|---|---|---|
| 2,656,508 | A | 10/1953 | Coulter |
| 3,910,702 | A | 10/1975 | Corll |
| 4,130,754 | A | 12/1978 | Fosslien |
| 4,164,870 | A | 8/1979 | Scordato et al. |
| 4,488,814 | A | 12/1984 | Johnson |
| 4,873,875 | A | 10/1989 | Cork |
| 5,376,878 | A | 12/1994 | Fisher |
| 5,516,564 | A | 5/1996 | Root et al. |
| 5,695,092 | A | 12/1997 | Schrandt |
| 6,169,394 | B1 | 1/2001 | Frazier et al. |
| 6,285,807 | B1 | 9/2001 | Walt et al. |
| 6,382,228 | B1 | 5/2002 | Cabuz et al. |

(Continued)

*Primary Examiner* — Sing P Chan

(74) *Attorney, Agent, or Firm* — Brian C Trask

(57) ABSTRACT

A method to manufacture microfluidic sensors 100, 100', 132, 280, 380, includes stacking a plurality of layers of material to form at least a first cap layer 102, a first channel layer 104, an interrogation layer 106, and a second channel layer 108. During assembly, ribbon sections of substrate layers are sandwiched to cooperatively align elements through-the-thickness of the sandwich. Individual sensors are then removed from the sandwich ribbon 504. A componentizing step includes forming one or more element for successive sensors spaced along the axial length of a ribbon of substrate material. Certain elements include electrically conductive patterned structures 250 printed onto a substrate using conductive ink and a printing process. Sometimes, the printing process places material in operable position to conduct electricity through the thickness of at least one ribbon. Other elements may include channels 112, 116; tunnels 114, and vias 260, 268.

20 Claims, 15 Drawing Sheets

(56) References Cited

U.S. PATENT DOCUMENTS

| | | | |
|---|---|---|---|
| 6,396,584 | B1 | 5/2002 | Taguchi et al. |
| 6,426,615 | B1 | 7/2002 | Mehta |
| 6,437,551 | B1 | 8/2002 | Krulevitch et al. |
| 6,440,725 | B1 | 8/2002 | Pourahmadi et al. |
| 6,454,945 | B1 | 9/2002 | Weigl et al. |
| 6,488,896 | B2 | 12/2002 | Weigl et al. |
| 6,656,431 | B2 | 12/2003 | Holl et al. |
| 6,663,353 | B2 | 12/2003 | Lipscomb et al. |
| 6,703,819 | B2 | 3/2004 | Gascoyne et al. |
| 6,703,849 | B2 | 3/2004 | Ishioka et al. |
| 6,794,877 | B2 | 9/2004 | Blomberg et al. |
| 7,223,371 | B2 | 5/2007 | Hayenga et al. |
| 2002/0061260 | A1 | 5/2002 | Husar |
| 2002/0117517 | A1 | 8/2002 | Unger et al. |
| 2003/0180965 | A1 | 9/2003 | Yobas et al. |
| 2004/0151629 | A1 | 8/2004 | Pease et al. |
| 2005/0054078 | A1 | 3/2005 | Miller et al. |
| 2005/0118705 | A1 | 6/2005 | Rabbitt et al. |
| 2006/0073609 | A1 | 4/2006 | Shimizu |
| 2007/0193019 | A1 | 8/2007 | Feldman et al. |
| 2007/0278097 | A1 | 12/2007 | Bhullar et al. |
| 2008/0047836 | A1 | 2/2008 | Strand et al. |
| 2008/0050752 | A1 | 2/2008 | Sun et al. |
| 2008/0076997 | A1 | 3/2008 | Peyser et al. |

METHOD FOR MANUFACTURING A MICROFLUIDIC SENSOR

PRIORITY CLAIM

This is a continuation of United States utility patent application Ser. No. 12/936,243, filed Oct. 4, 2010, now U.S. Pat. No. 8,182,635 titled "METHOD FOR MANUFACTURING A MICROFLUIDIC SENSOR", which is a United States National Phase utility patent application from PCT application serial No. PCT/US2009/002172, filed Apr. 7, 2009, titled "METHOD FOR MANUFACTURING A MICROFLUIDIC SENSOR", and claims the benefit of the filing date of U.S. Provisional Patent Application Ser. No. 61/123,248, filed Apr. 7, 2008, for "METHOD TO MANUFACTURE A MICROFLUIDIC SENSOR" and Ser. No. 61/124,121, filed Apr. 14, 2008, for "METHOD TO MANUFACTURE A MICROFLUIDIC SENSOR", the entire contents of which are hereby incorporated by this reference.

TECHNICAL FIELD

This invention relates to devices for interrogating particles that are entrained in a fluid. It is particularly directed to a method for manufacturing such devices.

BACKGROUND

The principle of particles causing a change in electric impedance as they occlude a portion of an aperture between electrically charged vessels is disclosed in U.S. Pat. No. 2,656,508 to W. H, Coulter. Since publication of his patent, considerable effort has been devoted to developing and refining sensing devices operating under the Coulter principle. Relevant United States patents include U.S. Pat. No. 5,376,878 to Fisher; U.S. Pat. No. 6,703,819 to Gascoyne et al.; U.S. Pat. No. 6,437,551 to Krulevitch et al.; U.S. Pat. No. 6,426,615 to Mehta; U.S. Pat. No. 6,169,394 to Frazier et al.; U.S. Pat. No. 6,454,945 and U.S. Pat. No. 6,488,896 to Weigl et al.; U.S. Pat. No. 6,656,431 to Holl et al.; U.S. Pat. No. 6,794,877 to Blomberg et al.; and U.S. Pat. No. 7,417,418 to Ayliffe. All of the above-referenced documents are hereby incorporated by reference, as though set forth herein in their entireties, for their disclosures of technology and various sensor arrangements.

The ability of certain particles to emit radiation at a different frequency than an applied excitation frequency is commonly known as Stokes-shift. Recent United States patents disclosing structure related to interrogation of such phenomena include: U.S. Pat. No. 7,450,238 to Heintzmann, et al.; U.S. Pat. No. 7,444,053 to Schmidt, et al.; U.S. Pat. No. 7,420,674 to Gerstner, et al.; U.S. Pat. No. 7,416,700 to Buechler, et al.; U.S. Pat. No. 7,312,867 to Klapproth, et al.; U.S. Pat. No. 7,300,800 to Bell, et al.; U.S. Pat. No. 7,221,455 to Chediak, et al.; and U.S. Pat. No. 7,515,268 to Ayliffe, et al. All of the above-referenced documents are hereby incorporated by reference, as though set forth herein in their entireties, for their disclosures of relevant technology and various sensor arrangements.

DISCLOSURE OF THE INVENTION

The present invention provides a method for manufacturing microfluidic sensors that may be utilized to interrogate particles suspended in a fluid. One operable method includes the steps of providing a thin film substrate; applying electrically conductive ink, by way of a printing process, onto both sides of the substrate to form at least one electrode disposed on each side thereof; and forming an interrogation tunnel through the thin film substrate. The method may also include forming circuit-forming contacts, as electrically communicating extensions of individual ones of the electrodes, on a single side of the substrate. In some cases, at least one circuit-forming contact is disposed in electrical communication with an electrode, carried on the opposite side of the substrate, by way of an electrically communicating via.

The method may also include adhering a first channel layer in registration with one side of the substrate to dispose a first channel element associated with the first channel layer for fluid communication through the interrogation tunnel; adhering a second channel layer in registration with the other side of the substrate to dispose a second channel element associated with the second channel layer for fluid communication through the interrogation tunnel and with the first channel element. The method may further include disposing a first electrode carried by the substrate to contact fluid flowing in the first channel element; and disposing a second electrode carried by the substrate to contact fluid flowing in the second channel element. A further optional step includes disposing a third electrode for contact with fluid flowing between the first electrode and the second electrode; and configuring the first electrode and the second electrode in harmony with a respective local portion of respective associated channel elements effective to dispose a surface area, sized in excess of about 5 $mm^2$, of each such electrode for contact with fluid flowing through the channel portion. A further optional step includes disposing a fourth electrode for contact with fluid flowing between the first electrode and the second electrode.

The method may sometimes include configuring electrodes, during the printing process, in a pattern disposed to cooperate with a portion of one or more channel element effective to permit electrically-based interrogation of a known volume of fluid with the sensor. The method may sometimes include configuring electrodes, during the printing process, in a pattern effective to permit detection of a signal indicating arrival of a fluid wave-front at a known position in the sensor. The method may sometimes include configuring electrodes, during the printing process, in a pattern effective to permit particle detection in an interrogation zone comprising the interrogation tunnel. The method may also include disposing a third electrode for contact with fluid flowing between the first electrode and the second electrode; and disposing the third electrode upstream of the interrogation tunnel such that fluid flows completely along the length of the third electrode before flowing into the tunnel. The method may include disposing a third electrode for contact with fluid flowing between the first electrode and the second electrode; and disposing the third electrode downstream of the interrogation tunnel such that fluid flows completely along the length of the third electrode before contacting the second electrode.

The invention may be embodied in a method for manufacturing a multilayer microfluidic sensor. One such method includes providing a plurality of layers of material configured to permit their stacking to form at least a first cap layer, a first channel layer, an interrogation layer, and a second channel layer. The various layers are stacked and cooperatively adhered to form an integrated multilayer sandwich. Desirably, the first channel layer carries a plurality of first channel elements disposed spaced apart along a length axis of the first channel layer. It is further desirable for the interrogation layer to carry a plurality of tunnel elements disposed spaced apart along a length axis of the interrogation layer, and for the second channel layer to carry a plurality of second channel elements disposed spaced apart along a length axis of the second channel layer. The method may further include separating a plurality of sensors from the sandwich such that each separated sensor includes a lumen adapted to permit fluid flow there-through, such lumen including a first channel element disposed in fluid communication, through a tunnel element, with a second channel element. The first channel layer and second channel layer may be formed from double-sided self-adhesive film. Sometimes, stacking and adhering includes use of indexing structure effective to operably align elements of individual sensors through-the-thickness of the sandwich. desirably, the method includes using a printing process to apply electrodes onto the interrogation layer in a pattern effective to dispose a plurality of electrodes spaced apart along a length axis of the interrogation layer such that at least one electrode is included in each separated sensor. Desirably, that electrode is disposed to contact fluid flowing through the lumen. The method may include applying said electrodes to the interrogation layer in a pattern that is repeated along a length direction of the interrogation layer. The method typically includes forming the plurality of tunnel elements subsequent to printing the electrodes on the interrogation layer. However, tunnel formation can be done prior to, or even during, electrode printing.

In certain cases, the electrodes may be applied to both sides of the interrogation layer, and surface contact electrodes on only one side of the interrogation layer. In such cases, at least one surface contact electrode may be in electrical communication with an electrode carried on the other side of the interrogation layer by way of an electrically conductive via. The method may be practiced by pre-forming elements associated with certain layers in a reel-to-reel operation effective to form one or more componentized layer; and stacking that componentized layer in a reel-to-reel process to form the sandwich. Alternatively, the method may be practiced by pre-forming elements associated with certain layers in a reel-to-reel operation effective to form one or more componentized layer, and stacking discrete lengths of one or more componentized layer to form the sandwich. The method may include applying a discrete substrate to the second channel layer.

These features, advantages, and alternative aspects of the present invention will be apparent to those skilled in the art from a consideration of the following detailed description taken in combination with the accompanying drawings.

BRIEF DESCRIPTION OF THE DRAWINGS

In the drawings, which illustrate what are currently considered to be the best modes for carrying out the invention.

BEST MODES FOR CARRYING OUT THE INVENTION

Figure 1:
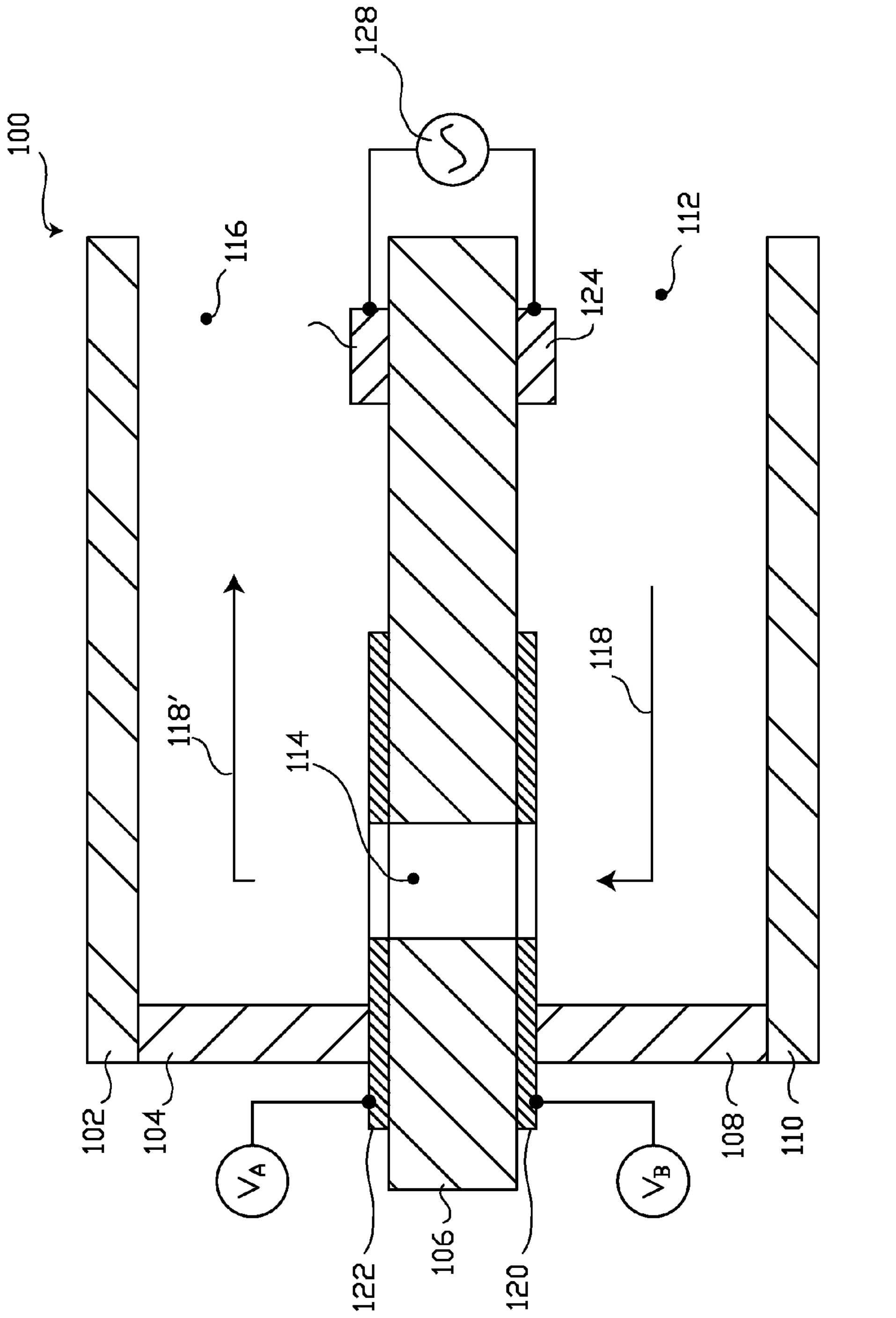
FIG. 1 is a cross-section in elevation taken through a multilayer sensor arrangement that may be manufactured according to certain principles of the instant invention.

Reference will now be made to the drawings in which the various elements of the invention will be given numerical designations and in which the invention will be discussed so as to enable one skilled in the art to make and use the invention. It is to be understood that the following description is only exemplary of the principles of the present invention, and should not be viewed as narrowing the claims which follow. The exploded assembly drawings are internally consistent to-scale, with components and elements being aligned along the axis of explosion.

Currently preferred embodiments that may be manufactured according to certain principles of the present invention provide low-cost, disposable, sensors operable to perform analyses of various sorts on particles that are carried in a fluid. Sensors manufactured according to certain principles of the instant invention may be used once, and discarded. However, it is within contemplation that such sensors may alternatively be reused a number of times.

Certain sensors that may benefit from application of certain principles of the instant invention are disclosed in: U.S. patent application Ser. No. 11/193,984, filed Jul. 29, 2005, and titled “DISPOSABLE PARTICLE COUNTER CARTRIDGE”; U.S. patent application Ser. No. 11/452,583, filed Jun. 14, 2006, and titled “THIN FILM SENSOR”; U.S. patent application Ser. No. 11/701,711, filed Feb. 2, 2007, and titled “FLUORESCENCE-ACTIVATED CELL DETECTOR”; U.S. patent application Ser. No. 11/800,167, filed Apr. 4, 2007, and titled “THIN FILM PARTICLE SENSOR”; U.S. patent application Ser. No. 12/001,303, filed Dec. 10, 2007, and titled “METHOD TO CONFIRM FLUID FLOW THOUGH A MICROFLUIDIC DEVICE”; U.S. provisional patent application Ser. No. 60/995,752, filed Sep. 29, 2007, and titled "INSTRUMENTED PIPETTE TIP"; and U.S. provisional patent application Ser. No. 61/004,630, filed Nov. 27, 2008, and titled "FLUORESCENCE-BASED PIPETTE INSTRUMENT". The entire contents of all of the above-referenced and commonly-owned applications are hereby incorporated, as though set forth herein in their entirety, for their disclosures of certain operable constituent materials, constructions, and ways to use sensors.

Examples of analyses in which embodiments manufactured according to certain principles of the invention may be used to advantage include, without limitation, counting, characterizing, or detecting members of any cultured cells, and in particular blood cell analyses such as counting red blood cells (RBCs) and/or white blood cells (WBCs), complete blood counts (CBCs), CD4/CD8 white blood cell counting for HIV+ individuals; whole milk analysis; sperm count in semen samples; and generally those analyses involving numerical evaluation or particle size distribution for a particle-bearing fluid (including nonbiolgical). Embodiments of the invention may be used to provide rapid and point-of-care testing, including home market blood diagnostic tests. Certain embodiments may be used as an automated laboratory research cell counter to replace manual hemacytometry. It is within contemplation to combine embodiments manufactured according to principles of the instant invention with additional diagnostic elements, such as fluorescence, to permit sophisticated cellular analysis and counting (such as CBC with 5-part WBC differential). It is further contemplated that embodiments manufactured according to the present invention may be adapted to provide a low-cost fluorescence activated cell sorter (FACS).

For convenience in this disclosure, the invention will generally be described with reference to manufacture of a particle detector. Such description is not intended to limit the scope of the instant invention in any way. It is recognized that certain embodiments manufactured according to principles of the invention may be used simply to detect passage of particles, e.g. for counting. Other embodiments may be manufactured to determine particle characteristics, such as size, or type, thereby permitting discrimination analyses. Furthermore, for convenience, the term "fluid" may be used herein to encompass a fluid mix including a fluid base formed by one or more diluents and particles of one or more types suspended or otherwise distributed in that fluid base. Particles are assumed to have a characteristic "size", which may sometimes be referred to as a diameter, for convenience. Currently preferred embodiments of the invention are adapted to interrogate particles found in whole blood samples, and this disclosure is structured accordingly. However, such is not intended to limit, in any way, the application of the invention to other fluids including fluids with particles having larger or smaller sizes, as compared to blood cells.

In this disclosure, "single-file travel" is defined different than literally according to a dictionary definition. For purpose of this disclosure, substantially single-file travel may be defined as an arrangement of particles sufficiently spread apart and sequentially organized as to permit reasonably accurate detection of particles of interest. In general, We shoot for single particle detection at least about 80% of the time. When two particles are in the interrogation zone at the same, it is called coincidence, and there are ways to mathematically correct for it. Calibration may be performed using solutions having a known particle density (e.g. solutions of latex beads having a characteristic size similar to particle(s) of interest). Also, dilution of the particles in a fluid carrier may contribute to organizing particle travel. As a non-limiting example, it is currently preferred to use sensor devices structured to have sizes disclosed in this document for interrogation of fluid samples having a particle density of approximately between about $3\times10^3$ to about $3\times10^5$ cells/ml, where the particle size is on the order of the size of a red blood cell (e.g. 5 μm to 20 μm).

A sensor component formed by the instant process may be used in construction of a particle sensor separating two fluid reservoirs. Fluid in the reservoirs includes particles and/or biological cells that are typically suspended and measured in a conductive saline solution. A through-hole or tunnel (typically ranging from 50 nanometers to 200 microns in diameter) formed in the substrate forms an interrogation zone, and typically promotes substantially single file flow of particles between the fluid reservoirs. In one preferred use, electric current is applied to driven, or stimulated, electrodes (typically formed from conductive ink and disposed on opposite sides of a polymer substrate). One or more interrogation electrode is disposed to monitor an electrical property in the interrogation zone. As the particles/cells flow through the cell interrogation zone, they cause a momentary increase in net impedance, which is measured as a change in voltage at the one or more interrogation electrode. This voltage change can be measured using one or more conductive ink interrogation electrode disposed on one, or both, surface of the substrate. The measured voltage change is proportional to cell-size. Currently, the preferred sensor embodiment utilizes 2 driven surface electrodes, on opposite sides of the substrate, to produce a constant electric current (that flows through the cell interrogation zone) and 2 additional, separate interrogation electrodes (also on opposite sides of the substrate) to make a differential voltage measurement across the cell interrogation zone.

FIG. 1 illustrates certain operational details of a currently preferred sensor arrangement, generally indicated at 100, manufactured according to certain principles of the instant invention. As illustrated, sensor 100 includes a sandwich of five layers, which are respectively denoted by numerals 102, 104, 106, 108, and 110, from top-to-bottom. Layers 102 and 110 are sometimes made reference to as cap layers. Layers 104 and 108 are sometimes made reference to as channel layers. Also, layer 106 is sometimes made reference to as an interrogation layer. Equivalent structure to a selected illustrated layer may sometimes include a plurality of constituent sub-layers.

A first portion 112 of a conduit to carry fluid through the sensor arrangement 100 is formed in layer 108. Portion 112 is disposed parallel to, and within, the layers, and may be characterized as a channel, or sometimes, a channel element. A second portion 114 of the fluid conduit passes through layer 106, and therefore may be characterized as a tunnel or a tunnel element. A third portion 116 of the fluid conduit is formed in layer 104, and again may be characterized as a channel, or sometimes, a channel element. Fluid flow through the conduit is indicated by arrows 118 and 118'. Fluid flowing through the first and third portions flows in a direction generally parallel to the layers, whereas fluid flowing in the second portion flows generally perpendicular to the layers. Therefore, fluid flow may differentiate between structure forming a channel and structure forming a tunnel.

It is within contemplation that two or more of the illustrated layers may be concatenated, or combined. Rather than carving a channel out of the thickness of an entire layer, a channel element may be formed in a single layer by machining or etching a channel into a single layer, or by embossing, or folding the layer to include a space due to a local 3-dimensional formation of the substantially planar layer. For example, illustrated layers 102 and 104 may be combined in such manner. Similarly, illustrated layers 108 and 110 may be replaced by a single, concatenated, layer.

With continued reference to FIG. 1, middle layer 106 carries a plurality of surface electrodes arranged to dispose a plurality of electrodes in a 3-dimensional array in space. For purpose of this disclosure, a surface electrode is typically carried on a surface, and forms only a portion circumscribing a channel along which fluid may flow (e.g. a side, wall, or a floor). Fluid flow is "over", or "along" a surface electrode, generally parallel to the surface on which a surface electrode is carried. In contrast, a channel electrode typically circumscribes the entirety of a channel. Fluid flows generally "through" a channel electrode, typically perpendicular to the surface on which the channel electrode is carried. It is within contemplation that a layer 106 (or its equivalent), may carry either, or both, types of electrodes. It is also within contemplation to form (e.g. print, deposit) electrodes on the cap layers 102, 110, to supplement or replace the electrodes carried by one or both sides of interrogation layer 106.

Sometimes, electrodes are arranged to permit their electrical communication with electrical surface connectors disposed on a single side of the sandwich, as will be explained further below. As illustrated in FIG. 1, fluid flow indicated by arrows 118 and 118' passes over a pair of surface electrodes 120, 122, respectively. However, in alternative embodiments within contemplation, one or the other of electrodes 120, 122 may not be present. Typically, structure associated with flow portion 114 is arranged to urge particles, which are carried in a fluid medium, into substantially single-file travel through an interrogation zone associated with one of, or both of, electrodes 120, 122. Therefore, electrodes 120, 122 may sometimes be made reference to as interrogation electrodes. In certain applications, an electrical property, such as a current, voltage, resistance, or impedance indicated at $V_A$ and $V_B$, may be measured between electrodes 120, 122, or between one of, or both of, such electrodes and a reference.

Certain sensor embodiments employ a stimulation signal based upon driving a desired current through an electrolytic fluid conductor. In such case, it can be advantageous to make certain fluid flow channel portions approximately as wide as possible, while still achieving complete wet-out of the stimulated electrodes. Such channel width is helpful because it allows for larger surface area of the stimulated electrodes, and lowers total circuit impedance and improves signal to noise ratios. Exemplary embodiments used to interrogate blood samples include channel portions that are about 0.10 inches (2.5 mm) wide and about 0.001 inches (0.025 mm) high in the vicinity of the stimulated electrodes. When driving current through an electrode, it has been found desirable to limit current density to less than about 10 $mA/cm^2$. Therefore, in certain sensors, stimulated electrodes, such as electrodes 124 and 126 in FIG. 1, are disposed to present a wetted surface area in excess of about 1/10 $cm^2$ to the fluid flowing there-past. One currently preferred sensor includes stimulated electrodes having a wetted surface area greater than about 5 $mm^2$.

One design consideration concerns wettability of the electrodes. At some aspect ratio of channel height to width, the electrodes may not fully wet in some areas, leading to unstable electrical signals and increased noise. To a certain point, higher channels help reduce impedance and improve wettability. Desirably, especially in the case of interrogation electrodes, side-to-side wetting essentially occurs by the time the fluid front reaches the second end of the electrode along the channel axis. Of course, wetting agents may also be added to a fluid sample, or as a coating on an electrode, to achieve additional wetting capability.

Figure 6:
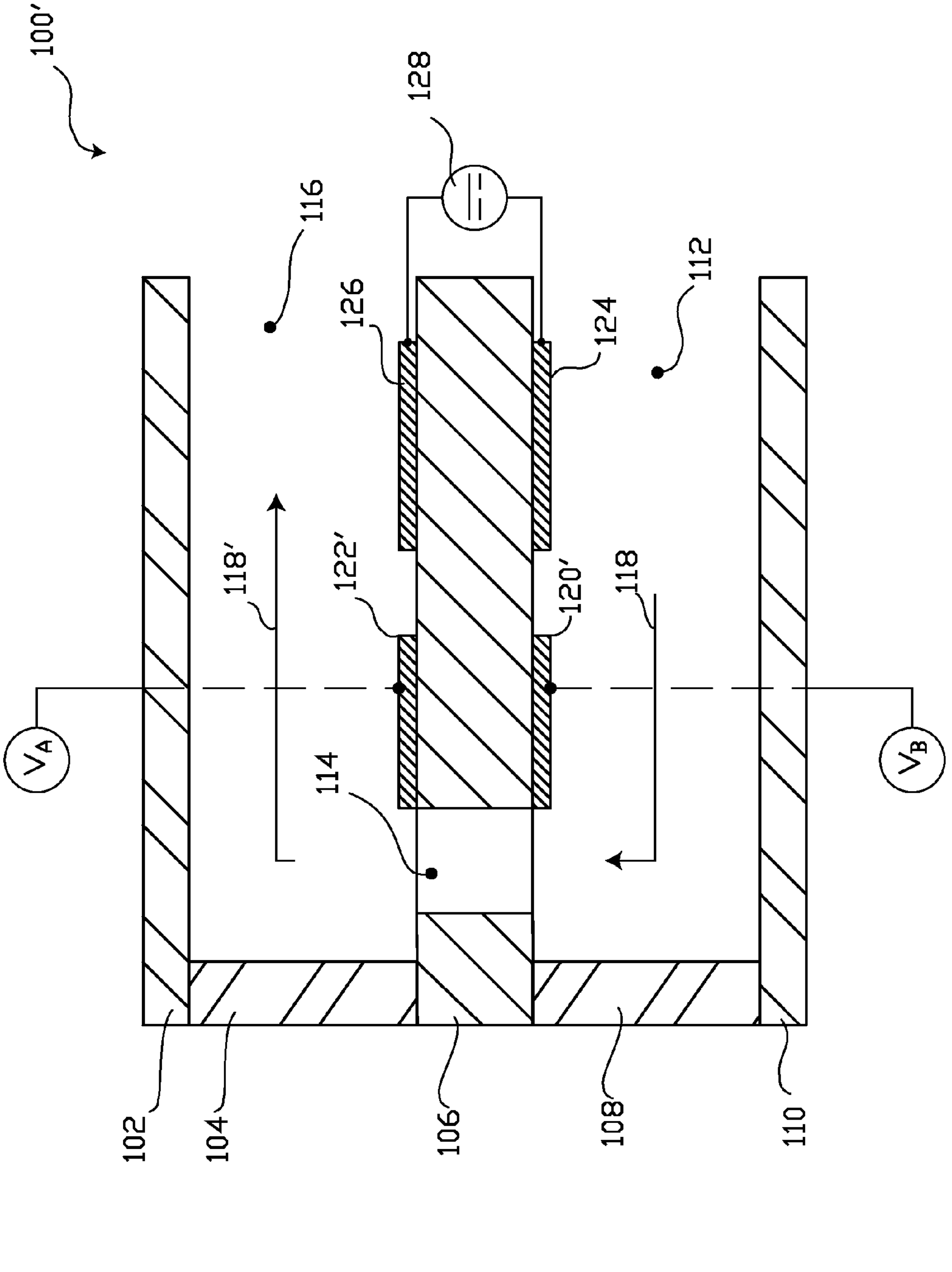
FIG. 6 is a cross-section in elevation taken through a multilayer sensor arrangement that may be manufactured according to certain principles of the instant invention.

Now with reference to FIG. 6, note that electrodes 120' and 122' are illustrated in an arrangement that promotes complete wet-out of each respective electrode independent of fluid flow through the tunnel forming flow portion 114. That is, in certain preferred embodiments, the entire length of an electrode is disposed either upstream or downstream of the tunnel forming flow portion 114. In such case, the "length" of the electrode is defined with respect to an axis of flow along a portion of the conduit in which the electrode resides. The result of the illustrated arrangement is that the electrode is at least substantially fully wetted independent of tunnel flow, and will therefore provide a stable, repeatable, and high-fidelity signal with reduced noise. In contrast, a surface electrode having a tunnel passing through itself may provide an unstable signal as the wetted area changes over time. Also, one or more bubble may be trapped in a dead-end, or eddy-area disposed near the tunnel (essentially avoiding downstream fluid flow), thereby variably reducing the wetted surface area of a tunnel-penetrated electrode, and potentially introducing undesired noise in a data signal.

In general, disposing the electrodes 120 and 122 closer to the tunnel portion 114 is better (e.g., gives lower solution impedance contribution), but the system would also work with such electrodes being disposed fairly far away. Similarly, a stimulation signal (such as electrical current) could be delivered using alternatively configured electrodes, even such as a wire placed in the fluid channel at some distance from the interrogation zone. The current may be delivered from fairly far away, but the trade off is that at some distance, the electrically restrictive nature of the extended channel will begin to deteriorate the signal to noise ratios (as total cell sensing zone impedance increases).

With reference once more to FIG. 1, electrode 124 is disposed for contact with fluid in conduit flow portion 112. Electrode 126 is disposed for contact with fluid in flow portion 116. It is currently preferred for electrodes 124, 126 to also be carried on a surface of interrogation layer 106, although other configurations are also workable. Note that an interrogation layer, such as an alternative to illustrated single layer 106, may be made up from a plurality of sub-component layers, potentially arranged to dispose one or more channel electrodes to encircle the circumference of the tunnel portion 114. In general, electrodes 124, 126 are disposed on opposite sides of the interrogation zone, and may sometimes be made reference to as stimulated electrodes. In certain applications, a signal generator 128 is placed into electrical communication with electrodes 124 and 126 to input a known stimulus to the sensor 100. However, it is within contemplation that one or both of electrodes 124, 126 may not be present in alternative operable sensors manufactured according to certain principles of the instant invention. In alternative configurations, any electrode in the sensor 100 may be used as either a stimulated electrode or interrogation electrode.

Figure 2:
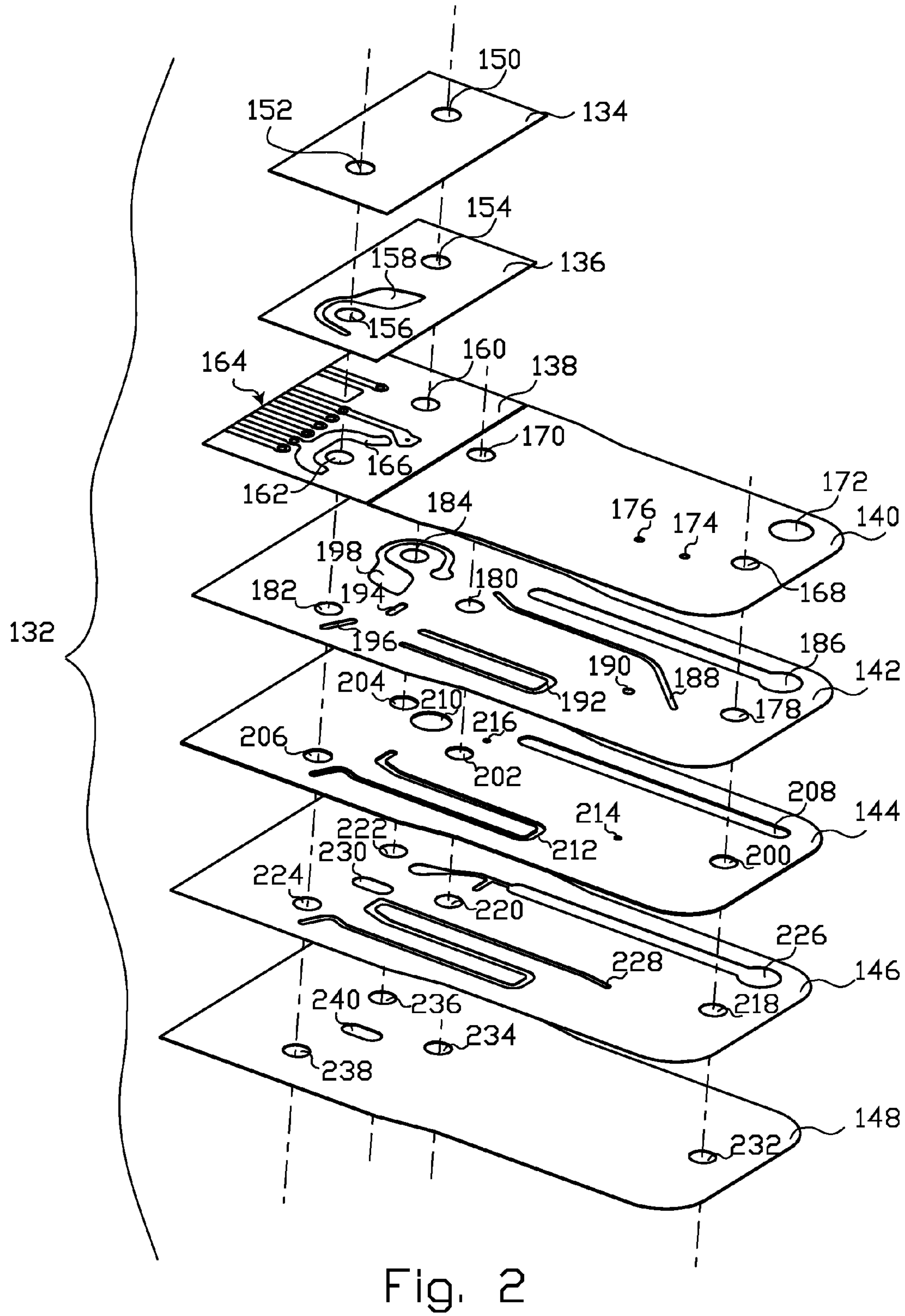
FIG. 2 is an exploded assembly view from above and in perspective of a sensor that may be manufactured according to certain principles of the instant invention.
Figure 3:
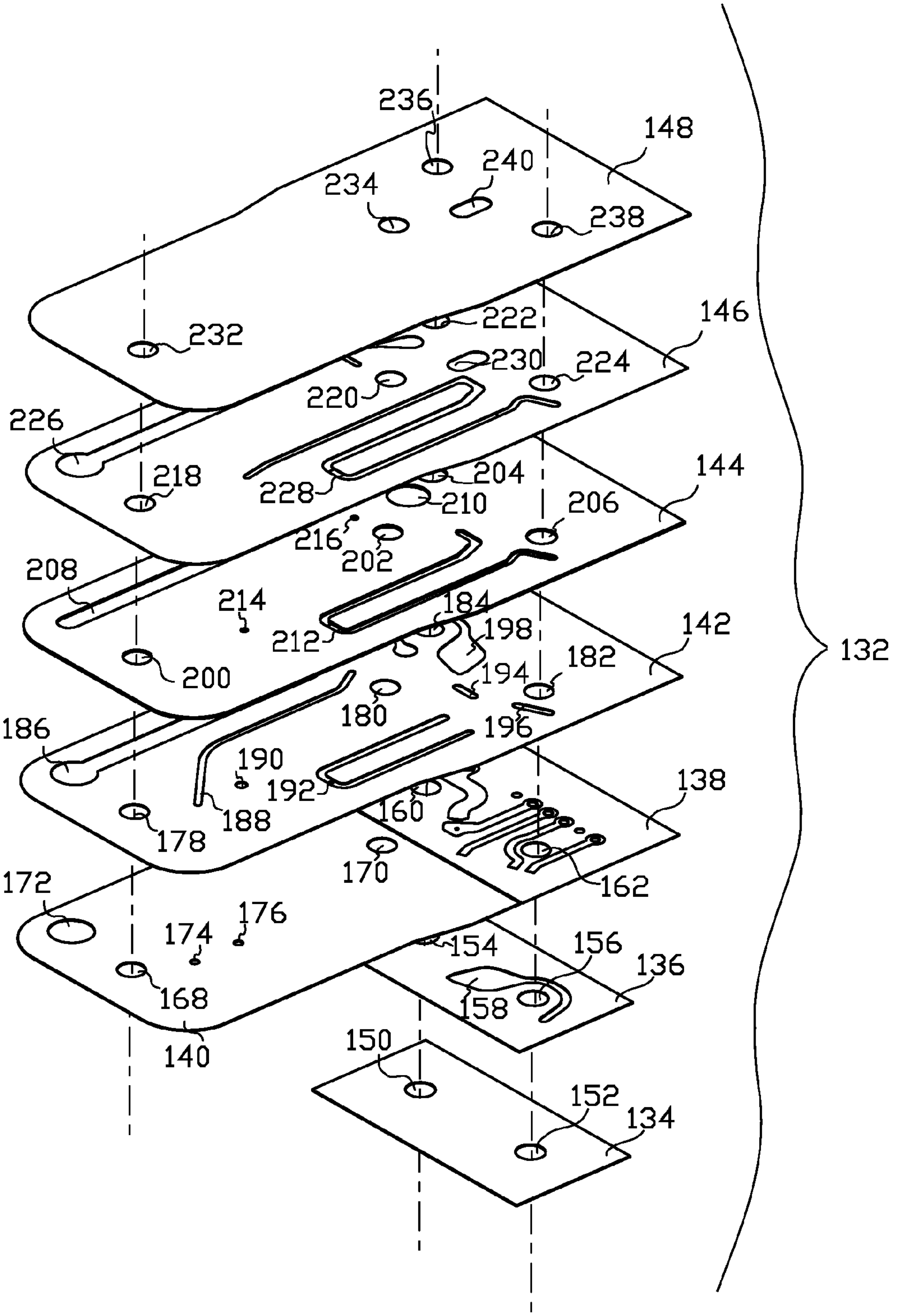
FIG. 3 is an exploded assembly view from below and in perspective of the sensor illustrated in FIG. 2.

FIGS. 2 through 5 illustrate an exemplary sensor, generally indicated at 132, that may be manufactured according to certain principles of the present invention. Sensor 132 includes a portion structured similarly to the cross-section illustrated in FIG. 1. With particular reference to FIGS. 2 and 3, sensor 132 may be regarded as a multi-layer sandwich including first cap layer 134, first channel layer 136, interrogation layer 138 second cap layer 140, second channel layer 142, third channel layer 144, fourth channel layer 146, and third cap layer 148.

First cap layer 134 carries tunnel elements 150 and 152. Such tunnel elements extend through the thickness of the cap layer 134, and function as alignment structure during assembly of sensor 132.

Channel layer 136 carries tunnel elements 154 and 156, as well as channel element 158. Tunnel elements 154 and 156 extend through the thickness of channel layer 136, and function as alignment structure during assembly of sensor 132. Channel element 158 also extends through the thickness of channel layer 136, and forms a portion of a lumen, or fluid-carrying conduit, extending through sensor 132.

Interrogation layer 138 carries tunnel elements 160 and 162, and electrically conductive elements, such as electrical contacts generally indicated at 164, and surface electrode 166. Tunnel elements 160 and 162 extend through the thickness of interrogation layer 138, and function as alignment structure during assembly of sensor 132. The electrode elements will be further detailed below, in connection with FIGS. 4 and 5.

Cap layer 140 carries tunnel elements 168, 170, 172, 174, and 176. All of such tunnel elements extend through the thickness of cap layer 140. Tunnel elements 168 and 170 may be used as alignment structure during assembly of sensor 132. Tunnel element 172 serves as a sample entrance port, and may be regarded as the entrance opening of the lumen extending through the sensor 132. Tunnel elements 174 and 176 communicate with the lumen, and may be used in series to draw a fluid sample through the sensor using an applied vacuum.

Channel layer 142 carries tunnel elements 178, 180, 182, 184, 186, 188, 190, 192, 194, 196, and 198. All of such tunnel elements extend through the thickness of channel layer 142. Tunnel elements 178, 180, 182, and 184 may be used as alignment structure during assembly of sensor 132. Tunnel elements 186, 188, 190, 192, 194, 196, and 198 individually form portions of the lumen extending through sensor 132. Therefore, certain of tunnel elements 186, 188, 190, 192, 194, 196, and 198 may also be regarded as channel elements.

Channel layer 144 carries tunnel elements 200, 202, 204, 206, 208, 210, 212, 214, and 216. All of such tunnel elements extend through the thickness of channel layer 144. Tunnel elements 200, 202, 204; and 206 may be used as alignment structure during assembly of sensor 132. Tunnel elements 208, 210, 212, 214, and 216 individually form portions of the lumen extending through sensor 132. Notably, tunnel elements 208 and 212 function as channel elements.

Channel layer 146 carries tunnel elements 218, 220, 222, 224, 226, 228, and 230. All of such tunnel elements extend through the thickness of channel layer 146. Tunnel elements 218, 220, 222, and 224 may be used as alignment structure during assembly of sensor 132. Tunnel elements 226 and 228 individually form channel portions of the lumen extending through sensor 132, and therefore, may also be regarded as channel elements. Tunnel element 230 may be included in certain embodiments to facilitate impinging radiation into the interrogation zone (e.g. for Stokes-shift interrogation of particles flowing there-through).

Cap layer 248 carries tunnel elements 232, 234, 236, 238, and 240. All of such tunnel elements extend through the thickness of channel layer 146. Tunnel elements 232, 234, 236, and 238 may be used as alignment structure during assembly of sensor 132. Tunnel element 240 may sometimes be included for purpose similar to tunnel element 230.

Figure 5:
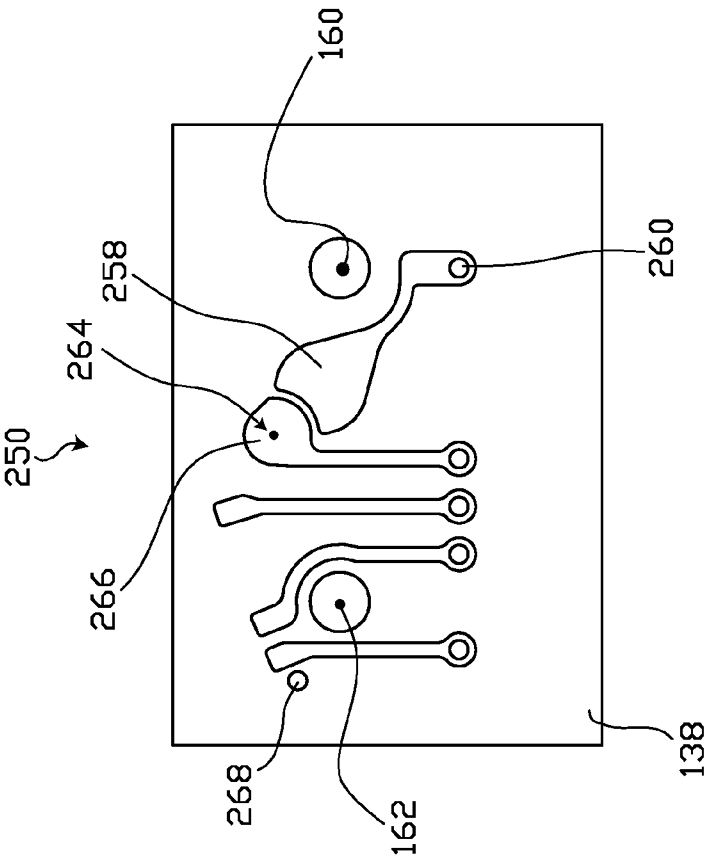
FIG. 5 is a plan view from below of an interrogation layer component of the sensor illustrated in FIG. 2.
Figure 4:
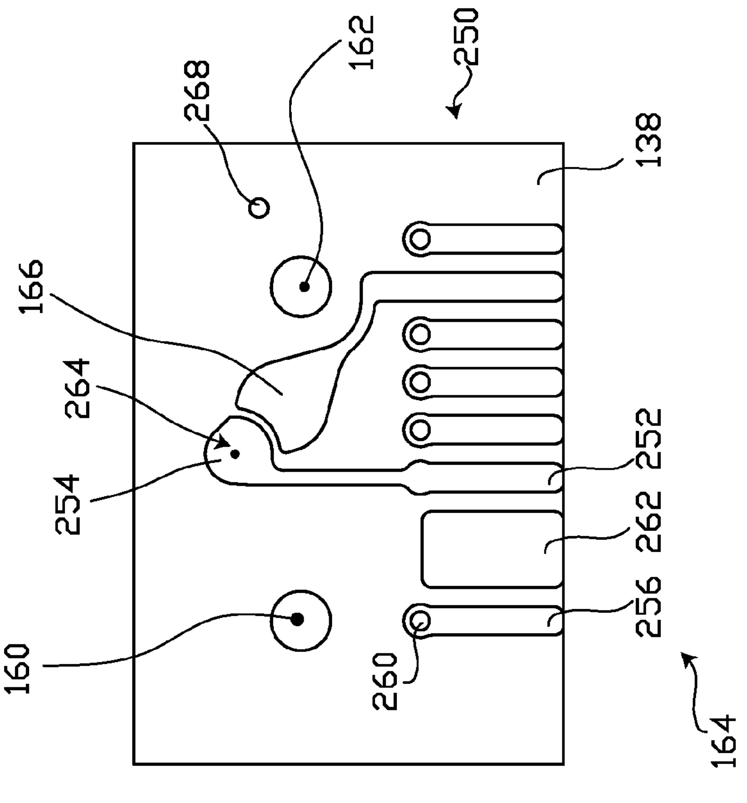
FIG. 4 is a plan view from above of an interrogation layer component of the sensor illustrated in FIG. 2.

With reference now to FIGS. 4 and 5, interrogation layer 138 carries a plurality of electrically conductive elements generally indicated at 250. Conductive elements 250 include electrical contacts generally indicated at 164, and surface electrodes, such as surface electrode 166. In general, an electrical contact forms part of a connection operable to place one or more electrically conductive element of a sensor in electrical communication with interrogation circuitry disposed external to the sensor. The illustrated electrical contacts indicated at 164 are configured to interface with an edge connector that is commercially available under part No. SEI-110-02-GF-S from Samtec, having a business contact address located at P.O. Box 1147, New Albany, Ind. 47151 and a web address of www.samtec.com.

Sometimes, an electrical contact may communicate with an electrode disposed on the same side of interrogation layer 138. For example, in FIG. 4, electrical contact 252 communicates with interrogation surface electrode 254. Other times, an electrical contact may communicate to an electrode disposed on the other side of interrogation layer 138. For example, electrical contact 256 communicates to stimulated electrode 258 by way of electrical via 260.

Figure 20:
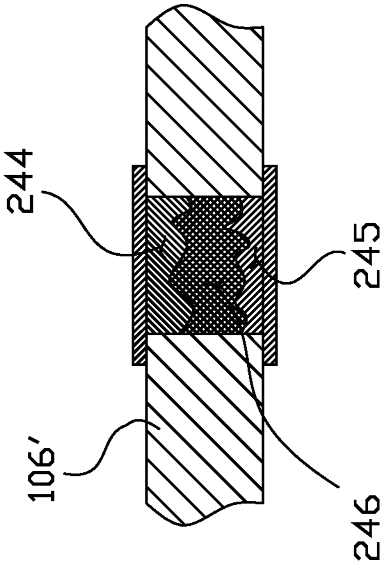
FIG. 20 is the cross-section in elevation of FIG. 19, with conductive material printed on the other side.
Figure 19:
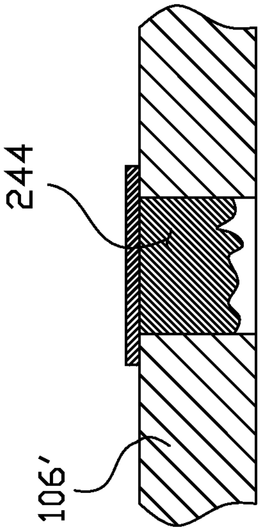
FIG. 19 is the cross-section in elevation of FIG. 18, with conductive material printed on one side.
Figure 18:
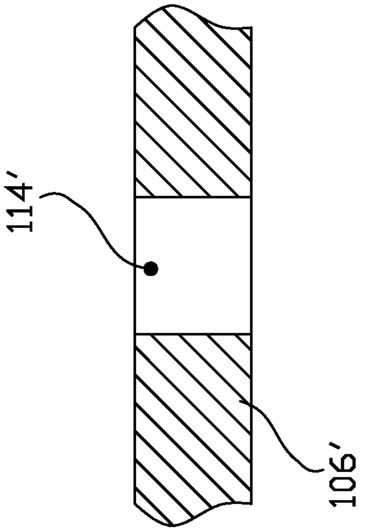
FIG. 18 is a cross-section in elevation taken through a via.

FIGS. 18 through 20 illustrate manufacture of an exemplary electrical via 260 according to certain principles of the present invention. In FIG. 18, a tunnel 114' is formed in a bare substrate 106'. FIG. 19 illustrates printing conductive material onto one side of the substrate, causing material flow 244 at least part way into the tunnel 114'. FIG. 20 illustrates subsequently printing conductive material onto the other side of substrate 106', causing material flow 245 into the tunnel 114'. An overlapping portion 246 of electrically conductive material forms an electrically conductive via 260 that communicates through the thickness of the substrate layer 106'.

With reference again to FIG. 4, an electrical contact may also form a portion of interrogation circuitry. For example, electrical contact 262 forms a jumper between adjacent pins of the edge connector that places sensor 132 in-circuit with external interrogation circuitry. Such an arrangement may be used to electrically validate correct and operable insertion of the sensor 132 into an interrogation device, for example.

Interrogation layer 138 also carries a plurality of tunnel elements, including previously discussed alignment structures 160 and 162. Interrogation layer 138 also carries an interrogation tunnel generally indicated at 264. Interrogation tunnel 264 is structured similarly to tunnel 114 in FIG. 1. Tunnel 264 is a through-hole formed after interrogation electrodes 254 and 266 are applied to the substrate of interrogation layer 138. The remaining illustrated tunnel 268 is a fluid via permitting fluid communication between channel 158 and channel 196 (e.g. see FIG. 2).

Figure 7:
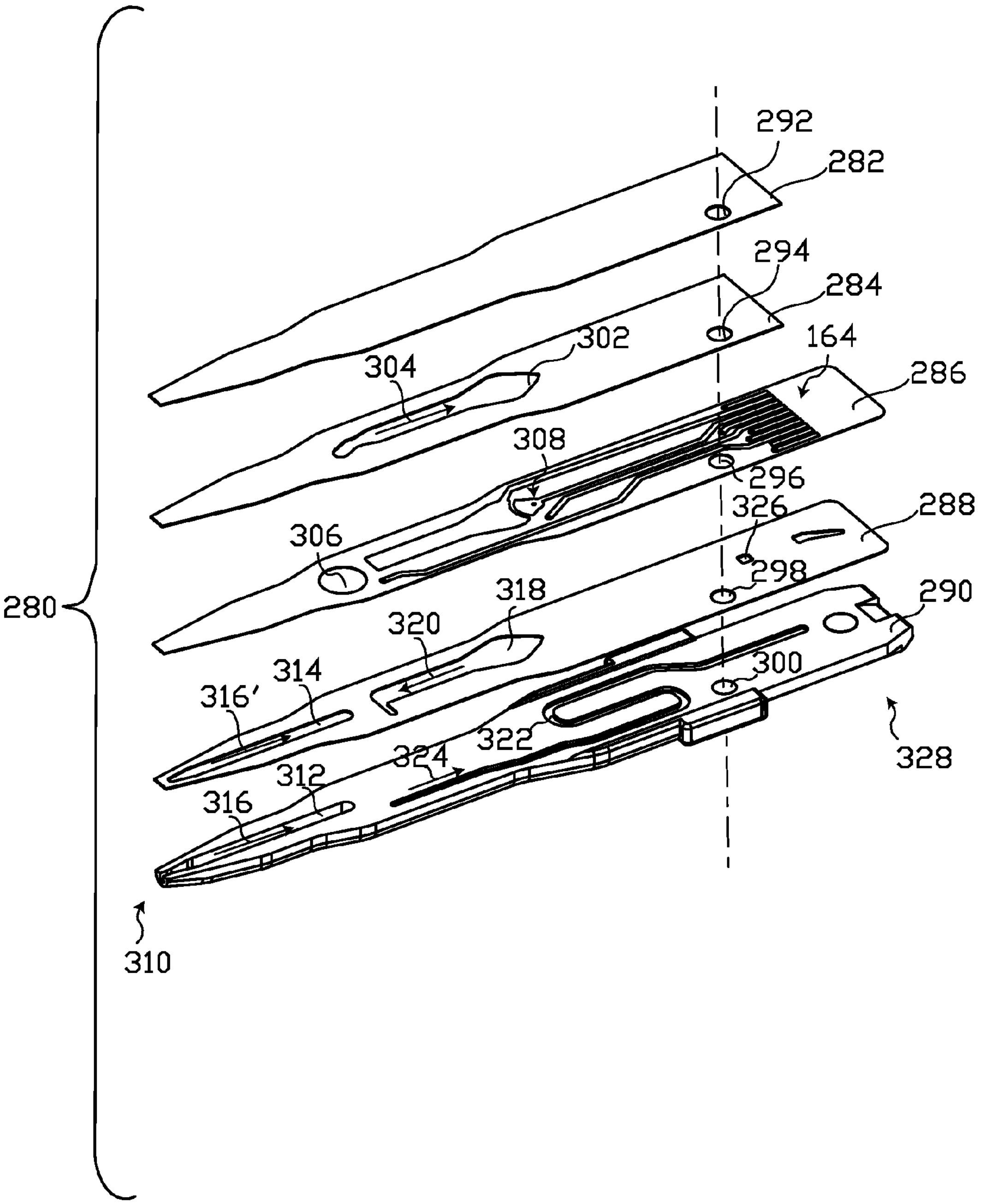
FIG. 7 is an exploded assembly view from above and in perspective of a sensor that may be manufactured according to certain principles of the instant invention.
Figure 8:
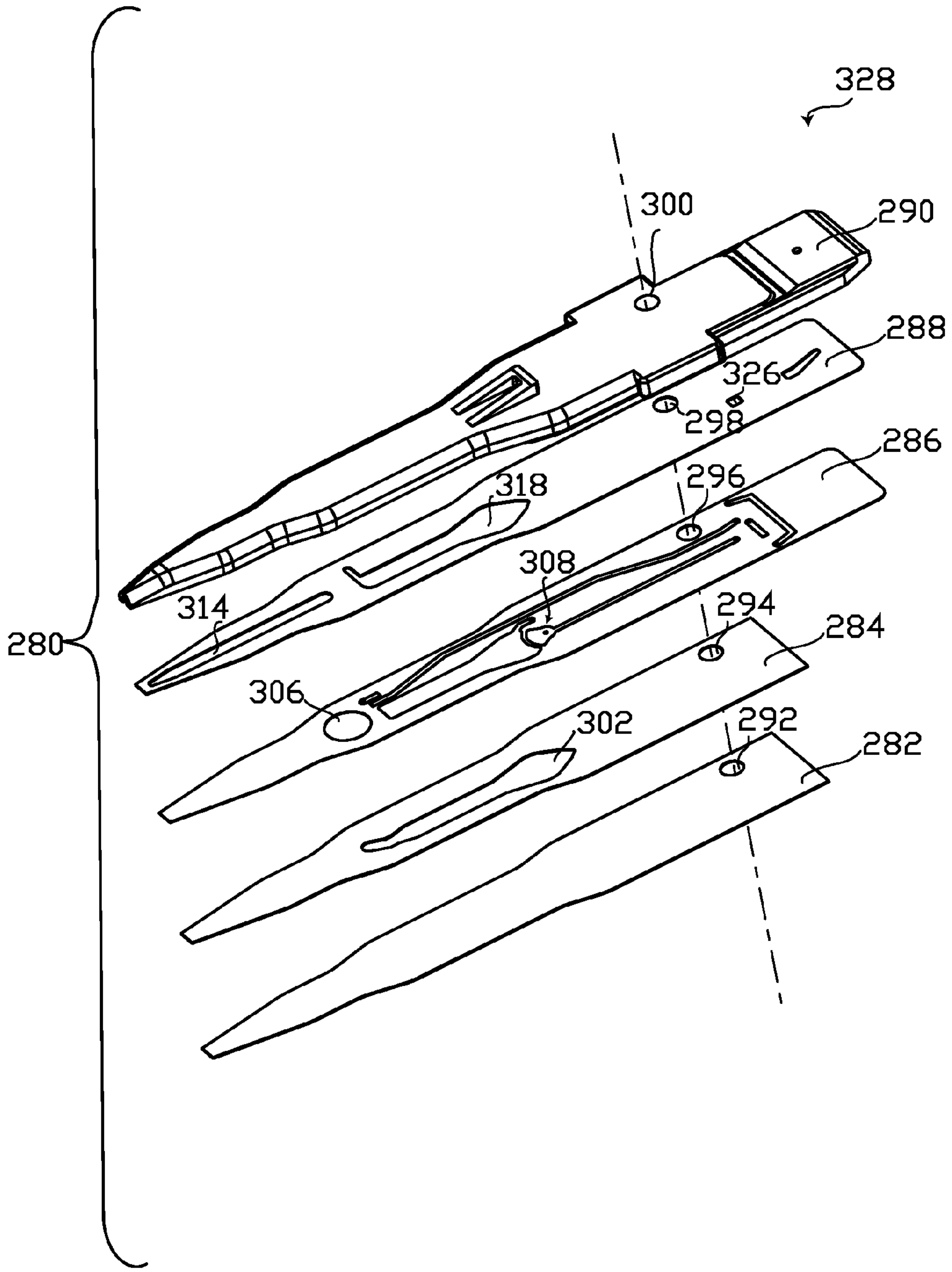
FIG. 8 is an exploded assembly view from below and in perspective of the sensor illustrated in FIG. 7.

FIGS. 7 through 10, and 15 and 16 illustrate certain aspects of another exemplary sensor, generally indicated at 280, that may be manufactured according to certain principles of the present invention. Sensor 280 is embodied as a pipette tip adapted to electrically interrogate a fluid sample. Pipette tip 280 includes a portion structured similarly to the cross-section illustrated in FIG. 1. With particular reference to FIGS. 7 and 8, sensor 280 may be manufactured as a multi-layer sandwich including cap layer 282, channel layer 284, interrogation layer 286, channel layer 288, and substrate 290. While the illustrated cap, channel and interrogation layers are typically formed from thin film materials, it is currently preferred to injection mold substrate 290 from a medical grade plastic material.

A plurality of tunnel elements 292, 294, 296, 298, 300 are desirably provided to facilitate alignment of the layers and substrate during assembly of the stack of component layers and substrate. Channel element 302 permits fluid to flow in indicated direction 304 along a lumen, or fluid conduit, through the pipette tip 280. Tunnel element 306 is adapted to receive a filter to reduce chance of a particle becoming lodged in the interrogation tunnel element indicated generally at 308. Fluid is first inspired into distal end 310 of the pipette tip 280, then flows along channels 312 and 314 (as indicated by arrows 316 and 316') before encountering the filter.

After flowing through interrogation tunnel 308, fluid flows through channel element 318 as indicated by arrow 320. Fluid continues along channel 322 as indicated by flow-indicating arrow 324. The tunnel element 326 permits electrodes carried by interrogation layer 286 to contact fluid in channel element 322. A suction profile may be applied to proximal end 328 (e.g. at through-hole 329) to cause fluid flow through the pipette tip's lumen, as desired. A counter bore may be disposed in association with hole 329 to function as a small reservoir to catch small amounts of fluid sample that overflows past stop trigger electrodes. It is further within contemplation to include one or more structural fluid termination element, such as a PTFE plug, or filter, film, that is effective to permit passage of gas, but resist flow of fluid. Such fluid-stop element is desirably disposed in association with hole 329 to resist flow of fluid from confinement inside the sensor-pipette tip.

Figure 15:
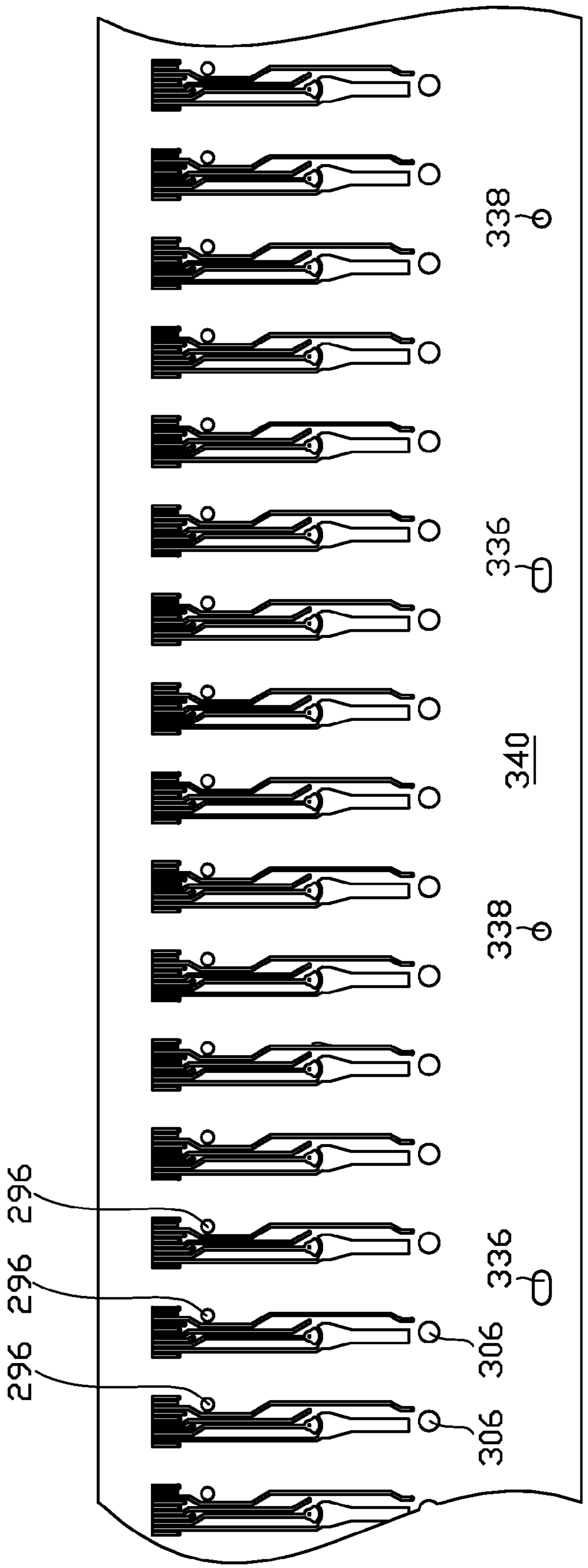
FIG. 15 is a plan view from above of a componentized interrogation layer manufactured according to certain principles of the instant invention.
Figure 16:
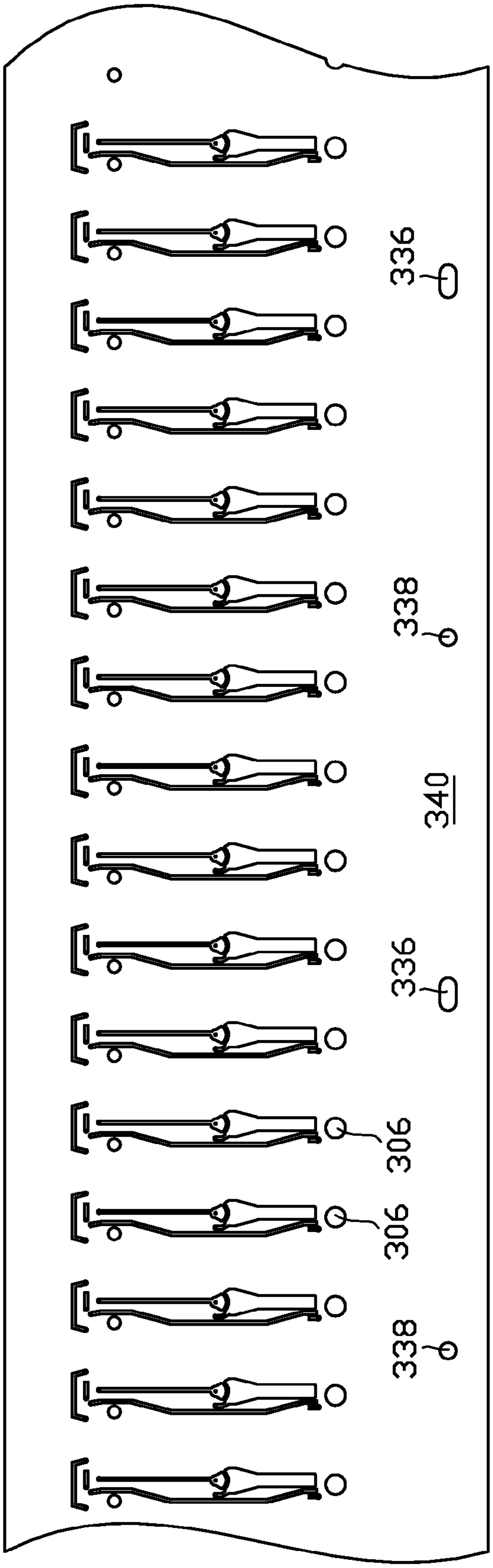
FIG. 16 is a plan view from below of the componentized interrogation layer illustrated in FIG. 15.

As illustrated in FIGS. 15 and 16, alignment tunnel elements 336 and 338 may be included spaced apart along a length axis of a ribbon of material 340 to assist in alignment of component elements through a thickness of ribbon 340 during application of patterned electrically conductive elements to ribbon 340. Certain alignment structure may also be used during assembly of the sandwich of layers to form a sensor, such as a pipette tip 280. The ribbon 340 illustrated in FIGS. 15 and 16 carries patterned elements of individual successive sensors that are spaced apart along the ribbon length axis, and is exemplary of a componentized layer. Such componentized layer may be formed in a reel-to-reel process ahead of time, and un-spooled during assembly of sensors. Alternatively, the successive groups of components (or elements) may be applied to a substrate, such as the ribbon, on-the-fly, e.g. just prior to assembly of the sensors.

In a currently preferred manufacturing process, ribbon 340 is un-spooled to send ribbon material past a printer that applies electrical elements to one side of the ribbon, then re-spooled for storage. In a second step, ribbon 340 is again un-spooled to print electrical elements on the other side of the ribbon, then re-spooled for storage. Finally, the fully componentized layer of ribbon is again un-spooled during a reel-to-reel manufacturing process to form the multilayer sandwich sensors. Of course, it is within contemplation to apply the electrical elements during a single un-spooling and re-spooling operation (e.g. using simultaneous-sides or staggered-side printing). The electrically conductive "ink" is generally cured (at least to some degree) prior to back side printing.

Figure 9:
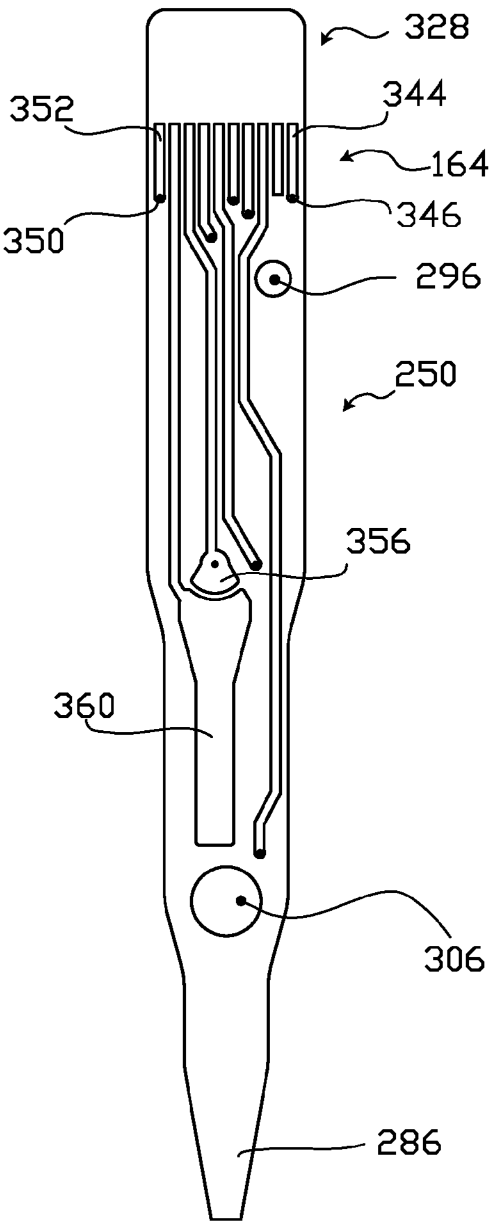
FIG. 9 is a plan view from above of an interrogation layer component of the sensor illustrated in FIG. 7.
Figure 10:
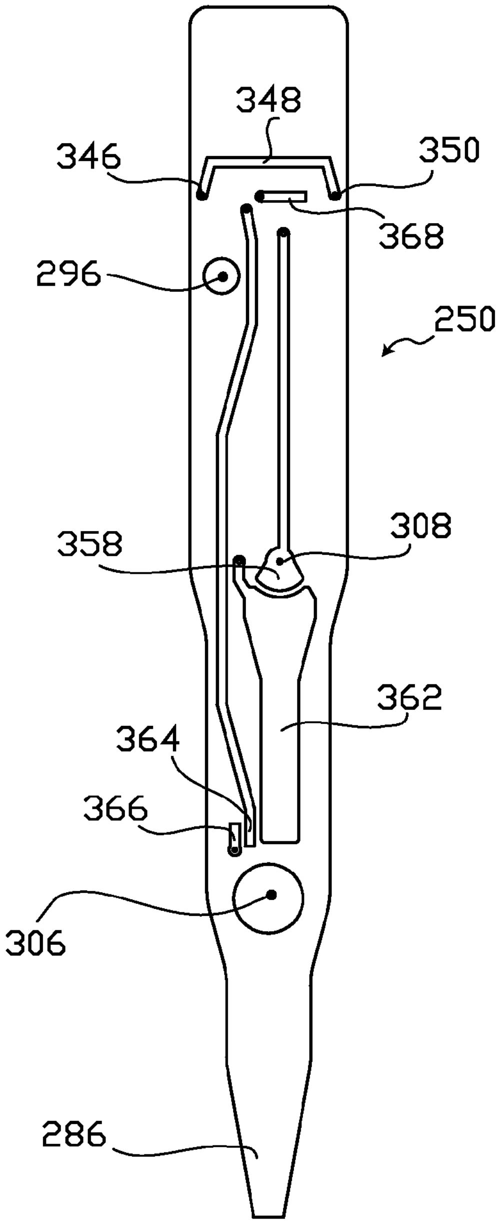
FIG. 10 is a plan view from below of an interrogation layer component of the sensor illustrated in FIG. 7.
Figure 11:
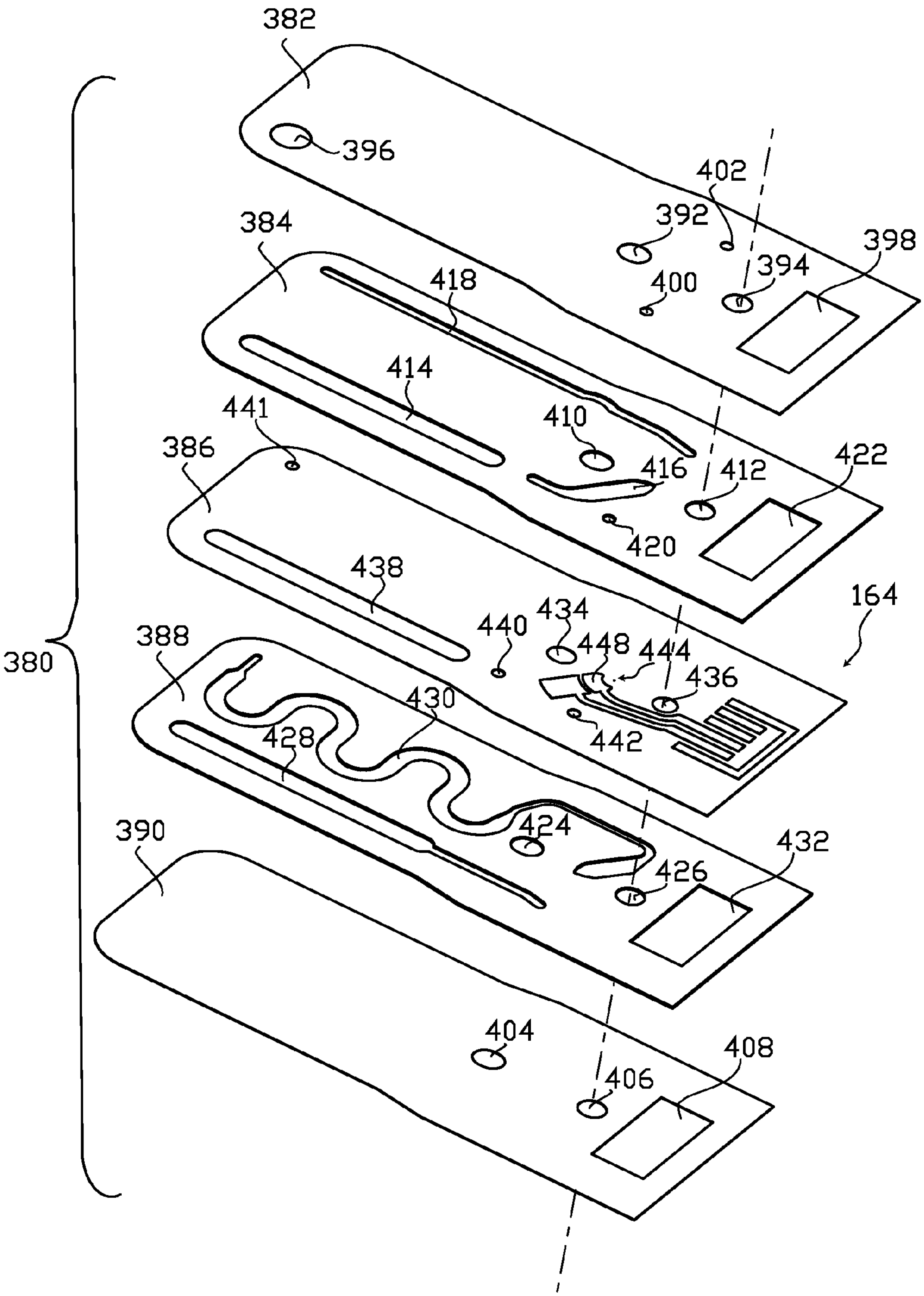
FIG. 11 is an exploded assembly view from above and in perspective of a sensor that may be manufactured according to certain principles of the instant invention.
Figure 12:
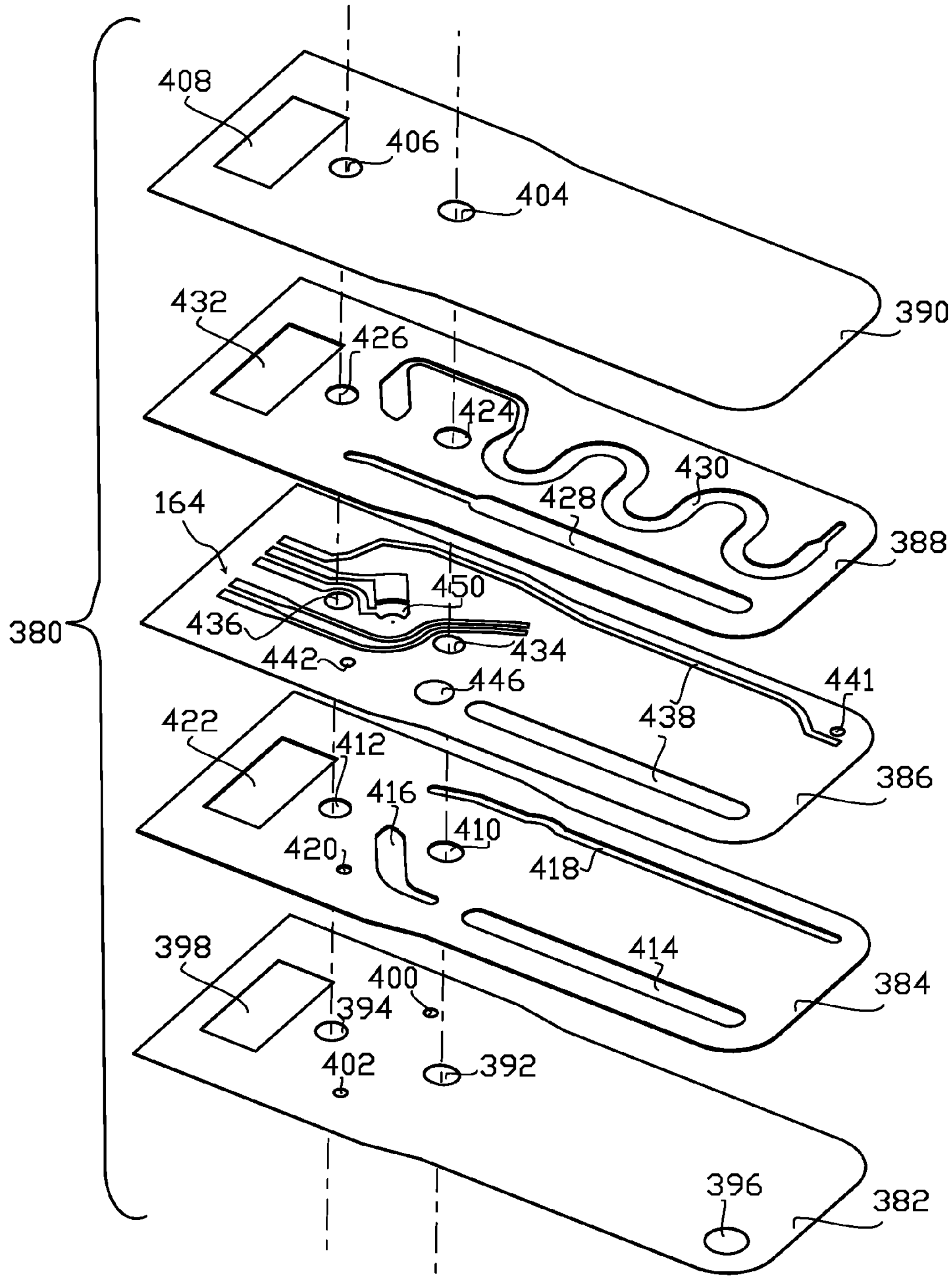
FIG. 12 is an exploded assembly view from below and in perspective of the sensor illustrated in FIG. 11.
Figure 14:
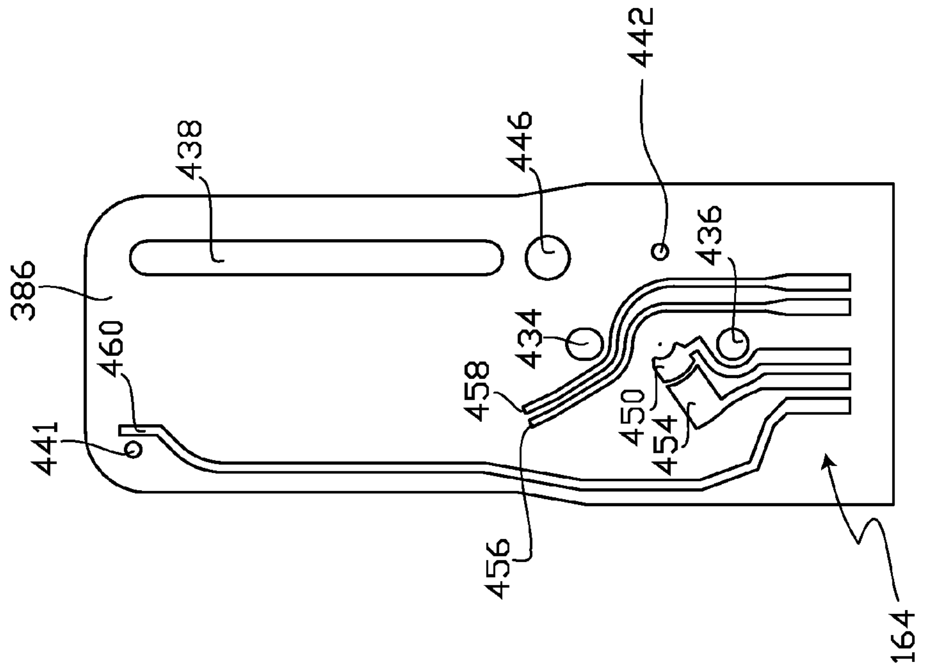
FIG. 14 is a plan view from below of an interrogation layer component of the sensor illustrated in FIG. 11.
Figure 13:
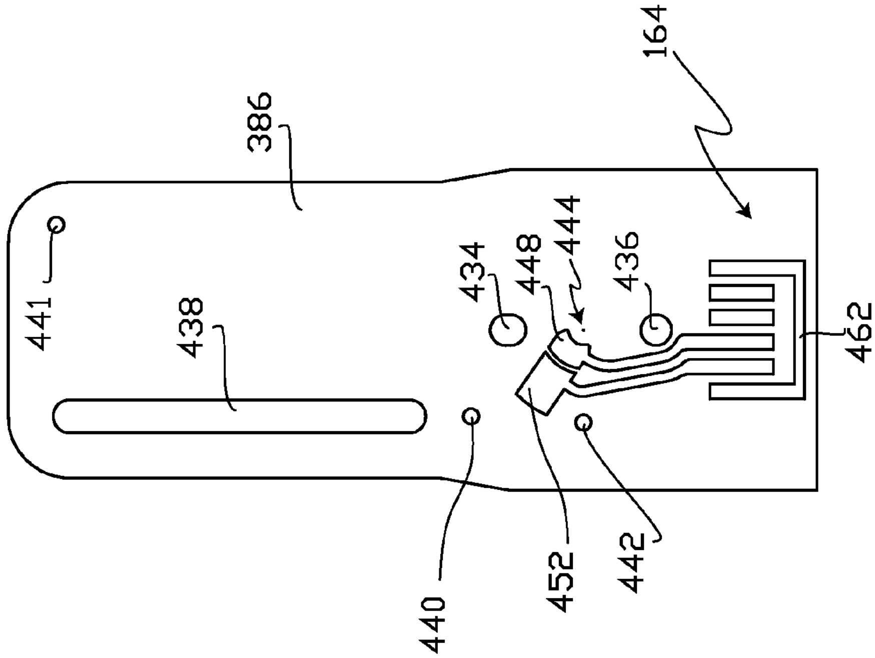
FIG. 13 is a plan view from above of an interrogation layer component of the sensor illustrated in FIG. 11.

With reference now to FIGS. 9 and 10, interrogation layer 286 carries a plurality of electrically conductive elements 250 arranged in a pattern disposed on each of its sides. For example, electrical contacts 164 are carried at the proximal end 328 in registration to be exposed by extending proximally beyond the proximal edge of channel layer 284 (see also FIG. 7). Electrical contact 344 communicates through electrical via 346 to jumper element 348 and then through electrical via 350 to electrical contact 352. Similar to jumper element 262 on layer 138, such an arrangement permits verification of proper registration of the sensor 280 with respect to an interrogation device.

The interrogation tunnel 308 is formed after interrogation electrode 356 and interrogation electrode 358 are applied to the substrate of layer 286. Stimulated electrode 360 is disposed to contact fluid in channel 304. Stimulated electrode 362 is disposed to contact fluid in channel 318. Trigger electrodes 364 and 366 are disposed to contact fluid in channel 318. Such electrodes may be employed to detect the arrival of a fluid front at a known location in the sensor 280. That is, an electrical signal may be monitored between such electrodes, and a change in signal (e.g. impedance) can be used as a trigger to start data collection, or as an input for other data purpose. Trigger electrode 368 is disposed to contact (through aperture 326) fluid flowing in channel 322. Electrode 368 is disposed downstream along the sensor's lumen, including a portion of channel 322, and can therefore provide a second signal indicating the arrival of a fluid front. Such signal can be used, for example, as a signal to stop collection of data, or in combination with a start signal, to verify inspiration of a known volume between generated trigger signal locations.

Another exemplary sensor, generally indicated at 380, that may be manufactured according to certain principles of the present invention is illustrated in FIGS. 11 through 14. Sensor 380 is a multilayer thin film sandwich, including cap layer 382, channel layer 384, interrogation layer 386 channel layer 388, and cap layer 390.

Cap layer 382 carries a plurality of through-the-thickness elements, including: alignment tunnels 392 and 394; sample orifice 396; electrical connection window 398; and vent openings 400 and 402. Cap layer 390 also carries a plurality of through-the-thickness elements, including: alignment tunnels 404 and 406; and electrical connection window 408.

Channel layer 384 carries a plurality of through-the-thickness elements, including: alignment tunnels 410 and 412; channel elements 414, 416, and 418; fluid via 420; and electrical connection window 422. Channel layer 388 also carries a plurality of through-the-thickness elements, including: alignment tunnels 424 and 426; channel elements 428 and 430; and electrical connection window 432.

Interrogation layer 386 carries a plurality of through-the-thickness elements, including: alignment tunnels 434 and 436; channel element 438; fluid vias 440, 441, and 442; and interrogation tunnel 444. A screen element 446 is illustrated in position to block passage of undesirably large-sized particles through fluid via 440 (see FIGS. 12 and 14). Electrical contact elements 164 are carried on both sides of layer 386. Note that interrogation electrodes 448 and 450 are "pulled-back" from the interrogation tunnel 444. Therefore, the particle interrogation portion of sensor 380 is structured similarly to the arrangement illustrated in FIG. 6. Electrically conductive elements carried by interrogation layer 386 include: contact electrodes indicated at 164; interrogation electrodes 448 and 450; stimulated electrodes 452 and 454; trigger electrodes 456, 458, and 460; and jumper element 462.

One aspect of the instant invention provides a method to form an inexpensive particle sensor component for use in a disposable thin film sensor capable of performing electric impedance-based particle (or biological cell) detection and analysis. The method includes providing conductive ink electrodes that are "printed" onto a substrate (e.g. indicated generally at 466 in FIG. 17). An operable ink includes a Silver/Silver Chloride solution, such as Dupont 5870 Ag/AgCl. Certain other operable inks are set forth on the world wide web at http://www2.dupont.com/MCM/en_US/PDF/biosensor-H9156101.pdf. Similar printable electrically conductive inks are available from Conductive Technologies, having a web site located at http://www.conductivetech.com.

Conventional screen printing techniques may be used to print patterned conductive electrically conductive traces on the front and/or back sides of a thin film substrate to form an interrogation layer 468. The currently preferred substrate is made from a polymer material, such as polyester. It is also within contemplation to incorporate a sputtering-type jet printing apparatus, such as an ink jet print head, to apply the conductive traces to a substrate. Line resolution with printed electrodes is similar to that obtained using conventional printed circuit technology. Line widths and spacing of 0.2 mm are possible. It is generally preferred that width and spacing not be smaller than 0.3 mm for most applications.

A conventional screen printing process is used for printing of the conductive inks in a currently preferred sensor component. Such process is analogous to that used in many applications, including shirt printing. A machine-specific fixture holds a screen that acts as a "negative" of the pattern to be printed. Screen mesh materials include metal wire, polyester, and many other polymers. The screen desirably has a known mesh value, i.e, number of woven "threads"/inch (each "thread" in an exemplary screen is a thin wire with ~1 mil dia). Ink fills the screen surface, and its viscosity limits flow through the screen. The screen is brought into contact with the substrate and ink is pressed with a squeegee through the screen onto the substrate. The screen thickness determines the thickness of the electrically conductive (typically metal, or metalized) traces. Uniform trace thickness is desirable in electronic printing as variations may result in nonuniform electronic behavior.

The screen is processed as follows: A preprinted pattern (negative) of the desired metal trace layout is placed over a screen mesh that has been pre-treated with a photo-curable ink. The screen and mask are exposed to UV light, curing the ink in the areas exposed to the light. In a wash step, the areas blocked by the mask (the metal trace pattern) are "opened" in the screen. The exposed areas and the underlying mesh remain blocked, and obstruct the flow of ink during the printing process. The screen may be reused multiple times.

Capillary effects between the ink and the substrate surface may be employed to draw ink through electrical vias to make a front-to-backside electrical connection. Vacuum may optionally be applied to assist the ink flow through one or more via. A porous backing material can be placed on the side of the substrate opposite the printed surface to absorb and reduce backside spattering of ink that flows through the vias. The substrate material can be held in contact with a support surface during printing using vacuum pressure (suction), electrical charge (static), adhesive tapes, or a variety of mechanical contact techniques.

In some cases. conventional, automated screen printing equipment may be used in the process to print electrically conductive electrode patterns on a substrate. Through-vias are currently drilled with a laser (although they can be formed using other techniques such as with a water jet, steel rule die, punch dies, and rotary dies, etc.). Printed panels (e.g. discrete lengths of one or more componentized layer) can be dried after each print step in an industrial dryer. Some printed inks are cured with UV light. Screen printing for high volume manufacturing can occur in a web-type, roll format or sheet feed type applications, nonexclusively including reel-to-reel processing.

With reference again to FIG. 17, a componentized length of interrogation ribbon may be un-spooled from reel 470. If the substrate 468 is not already componentized, elements may be printed, and channels, tunnels, vias, etc. as required may be formed or applied at processing stations 472 and 474. A currently preferred substrate for an interrogation ribbon includes Melinex 342, from Dupont Teijin Films, having a place of business located at 3600 Discovery Dr., Hopewell, Va. 23860, and a web site address of www.dupontteijinfilms.com An operable thickness range in film for such substrate material in currently preferred sensors is between about 0.03 mm and 0.30 mm.

A ribbon of channel layer substrate 476 is carried on reel 478. If ribbon 476 is not componentized, channel elements, vias, tunnels, etc., may be formed at a processing station 480. Similarly, a ribbon of channel substrate 482 is carried on reel 484. If ribbon 482 is not componentized, channel elements, vias, tunnels, etc., may be formed at a processing station 486. Channel layers such as 476 and 482 may be made from similar materials. A currently preferred channel substrate includes self-adhesive, double-sided ARcare 90445 tape, available from Adhesives Research, having a place of business located at 400 Seaks Run Rd., Glen Rock, Pa. 17327, and a web site address of www.adhesivesresearch.com. An operable thickness range in film for such substrate material in currently preferred sensors is between about 0.03 mm and 0.3 mm. Tape liners are spooled onto reels 488, 490, 492, and 494, respectively.

Figure 17:
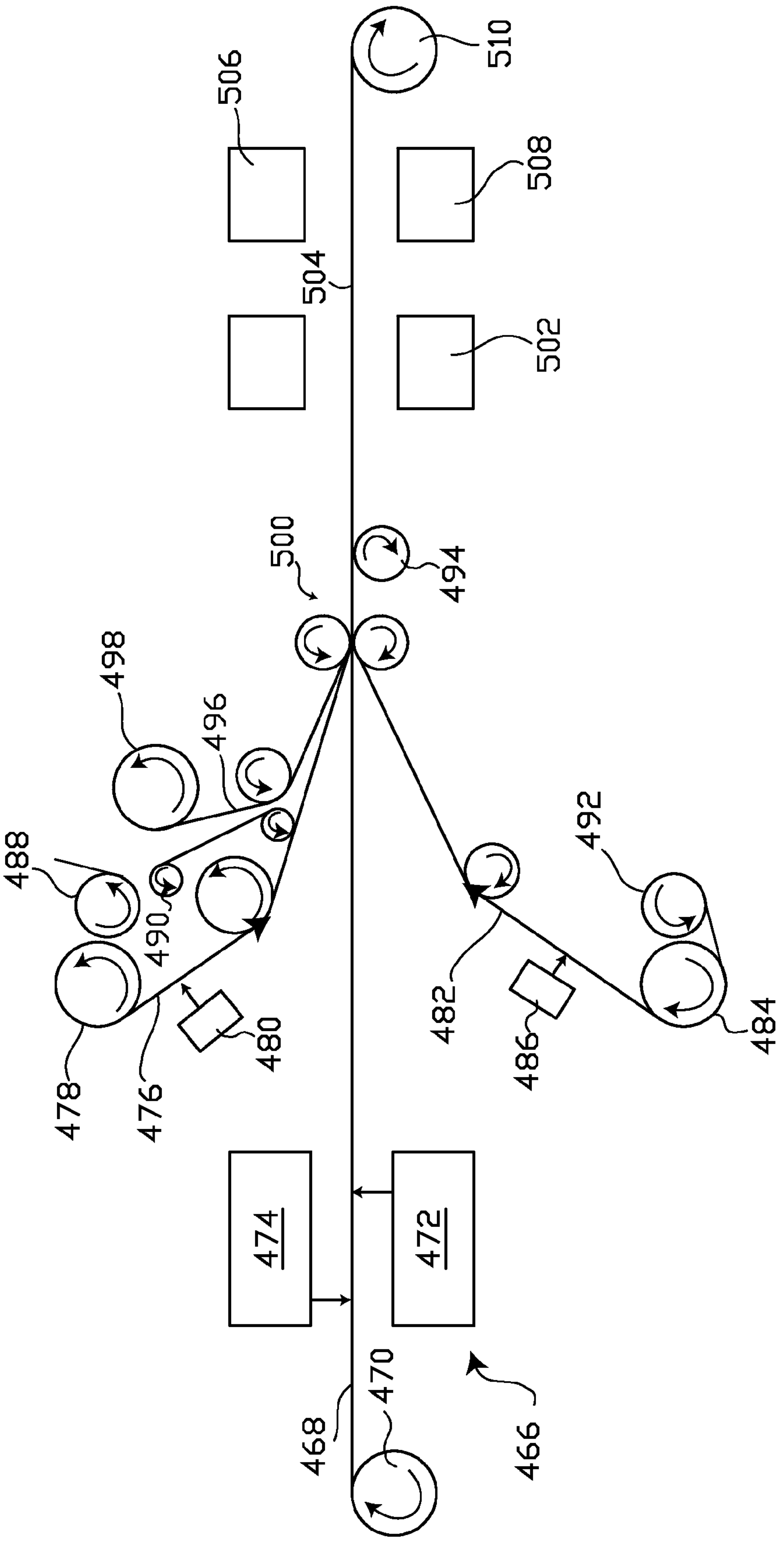
FIG. 17 is a schematic in elevation depicting a manufacturing arrangement operable to make sensors according to certain principles of the instant invention.

A ribbon of componentized cap layer 496 is carried on reel 498. A currently preferred cap layer substrate includes Mylar film, such as Melinex 342, from Dupont Teijin Films, having a place of business located at 3600 Discovery Dr., Hopewell, Va. 23860, and a web site address of www.dupontteijinfilms.com An operable thickness range in film for such substrate material in currently preferred sensors is between about 0.03 mm and 0.30 mm. If ribbon 496 is not pre-fabricated (componentized) to include the necessary elements, one or more processing utility may be inserted in the manufacturing process and disposed upstream of the sandwich-compacting pinch rollers generally indicated at 500. It is within contemplation that another cap layer ribbon may also be applied to a side of a sensor opposite cap layer 496 using substantially the same process arrangement illustrated for layer 496. Alternatively, and as illustrated in FIG. 17, a discrete substrate (such as element 290 in FIG. 7) may be applied at desired indexed locations to the exposed adhesive of channel ribbon 482 using substrate installation utility 502. Individual sensors are then removed (e.g. die cut, sheared-off, separated by water jet or laser, etc.), from sandwich ribbon 504 with processing utility 506. Sensors may be deposited into a container 508, and waste ribbon 504 can be wound onto reel 510.

While the invention has been described in particular with reference to certain illustrated embodiments, such is not intended to limit the scope of the invention. The present invention may be embodied in other specific forms without departing from its spirit or essential characteristics. For example, embodiments may be fabricated according to certain principles of the instant invention by printing one or more electrically conductive element on any two surfaces of a multilayer thin film assembly where one of the thin films (not necessarily one of the printed ones) contains a small through-hole (typically, but not necessarily, with a diameter less than about 0.2 mm) for fluid to pass through (i.e., the particle detection zone). Operable embodiments may be fabricated by printing one or more electrically conductive element onto at least one surface of a layer of a multilayer thin film assembly where one of the thin films (not necessarily a layer that includes one or more electrode) contains a small through-hole for fluid to pass there-through. An operable embodiment may also be fabricated by printing one or more electrically conductive element, onto one surface in the proximity of a thin film that includes a detection zone through-hole, and disposing at least one conductive electrode on the opposite side of the fluid through-hole.

It is further within contemplation to include printed electrically conductive element(s) on one or both capping layers using a similar multilayer construction (possibly in conjunction with printing electrically conductive element(s) on the "interrogation" layer, as described herein-above). An operable embodiment may also be fabricated as a 3 layer structure (the center one containing a through-hole defining a detection zone) with printed conductive elements disposed on either of the two surfaces on both sides of the detection zone. In certain cases, the fluid channels can be formed using a hot embossing technique in any of the layers. The layers may be hot laminated together. Workable embodiments may also be fabricated by combining one or more portion of the above-disclosed exemplary structures, and also including one layer having a rigid body (like the injection molded substrate of pipette tip 280). The rigid body may also be disposed between thin film layers.

Therefore, the described embodiments are to be considered as illustrative and not restrictive. The scope of the invention is indicated by the appended claims rather than by the foregoing description. All changes which come within the meaning and range of equivalency of the claims are to be embraced within their scope.

What is claimed is:

1. A method for manufacturing a microfluidic sensor, comprising:

providing a thin film substrate configured as an electrically insulating barrier effective to resist fluid and particle travel through uninterrupted portions there-of;

applying electrically conductive ink, by way of a printing process, onto structure for assembled disposition to form at least one electrode disposed on each side of said substrate;

forming a first tunnel through said thin film substrate by removing material from a portion of said thin film substrate to permit fluid passage there-through, said first tunnel being sized less than about 0.2 mm in a cross-section length to promote passage there-through of particles of interest in substantially single-file travel; and providing channel structure configured such that all fluid flowing from a position of contact with a first electrode disposed on a first side of said thin film substrate must pass through said first tunnel before encountering a second electrode disposed on the opposite side of said thin film substrate.

2. The method according to claim 1, further comprising:

forming circuit-forming contacts, as electrically communicating extensions of individual ones of said electrodes, on a single side of said substrate, at least one circuit-forming contact being disposed in electrical communication with an electrode, carried on the opposite side of said substrate, by way of an electrically communicating via.

3. The method according to claim 1, wherein the step of providing channel structure comprises:

affixing a first channel layer in registration with one side of said substrate to dispose a first channel element associated with said first channel layer for fluid communication through said tunnel;

affixing a second channel layer in registration with the other side of said substrate to dispose a second channel element associated with said second channel layer for fluid communication through said tunnel and with said first channel element; and disposing a first electrode to contact fluid flowing in said first channel element; and disposing a second electrode to contact fluid flowing in said second channel element.

4. The method according to claim 3, further comprising:

disposing a third electrode for contact with fluid flowing between said first electrode and said second electrode; and configuring said first electrode and said second electrode in harmony with a respective local portion of respective associated channel elements effective to dispose a surface area, sized in excess of about 5 $mm^2$, of each such electrode for contact with fluid flowing through said channel portion.

5. The method according to claim 4, further comprising:

disposing a fourth electrode for contact with fluid flowing between said first electrode and said second electrode.

6. The method according to claim 3, further comprising:

configuring electrodes, during said printing process, in a pattern disposed to cooperate with a portion of one or more channel element effective to permit electrically-based interrogation of a known volume of fluid with said sensor.

7. The method according to claim 3, further comprising:

configuring electrodes, during said printing process, in a pattern effective to permit detection of a signal indicating arrival of a fluid wave-front at a known position in said sensor.

8. The method according to claim 3, further comprising:

configuring electrodes, during said printing process, in a pattern effective to permit electrically-based particle detection in an interrogation zone comprising said tunnel.

9. The method according to claim 3, further comprising:

disposing a third electrode for contact with fluid flowing between said first electrode and said second electrode; and disposing said third electrode upstream of said tunnel such that fluid flows completely along the length of said third electrode before flowing into said tunnel.

10. The method according to claim 3, further comprising:

disposing a third electrode for contact with fluid flowing between said first electrode and said second electrode; and disposing said third electrode downstream of said tunnel such that fluid flows completely along the length of said third electrode before contacting said second electrode.

11. A method for manufacturing a multilayer microfluidic sensor, comprising:

providing a plurality of layers of material configured to permit their stacking to form at least a first cap layer, a first channel layer, an interrogation layer, and a second channel layer, said interrogation layer comprising a thin film substrate configured as an electrically insulating barrier effective to resist fluid and particle travel through uninterrupted portions there-of;

printing electrically conductive ink onto one or more of said plurality of layers effective to form electrodes that are disposed spaced apart along, and on both sides of, said interrogation layer;

stacking and cooperatively adhering said plurality of layers to form an integrated multilayer sandwich, wherein:

said first channel layer carries a plurality of first channel elements disposed spaced apart along a length axis of said first channel layer;

said interrogation layer carries a plurality of tunnel elements that are formed by removing material from said interrogation layer and that are sized to promote travel there-through of particles of interest in substantially single-file and are disposed spaced apart along a length axis of said interrogation layer; and said second channel layer carries a plurality of second channel elements disposed spaced apart along a length axis of said second channel layer; further comprising:

separating a plurality of sensors from said sandwich such that each separated sensor includes a lumen adapted to permit fluid flow there-through, said lumen comprising a first channel element disposed in fluid communication, through a tunnel element, with a second channel element, said lumen being arranged such that fluid and particle flow from said first channel element to said second channel element must pass through said tunnel element.

12. The method according to claim 11, wherein:

said first channel layer and said second channel layer are formed from double-sided self-adhesive film.

13. The method according to claim 11, wherein:

said stacking and adhering includes use of indexing structure effective to operably align elements of individual sensors through-the-thickness of said sandwich.

14. The method according to claim 11, further comprising:

using a printing process to apply said electrodes onto said interrogation layer in a pattern effective to dispose a plurality of electrodes spaced apart along a length axis of said interrogation layer such that at least one electrode is included in each separated sensor, said at least one electrode being disposed to contact fluid flowing through said lumen.

15. The method according to claim 11, further comprising:

forming said plurality of tunnel elements subsequent to printing said electrodes on said interrogation layer.

16. The method according to claim 14, further comprising:

applying said electrodes to both sides of said interrogation layer, and applying surface contact electrodes on only one side of said interrogation layer, at least one surface contact electrode being in electrical communication with an electrode carried on the other side of said interrogation layer by way of an electrically conductive via.

17. The method according to claim 11, further comprising:

pre-forming elements associated with certain layers in a reel-to-reel operation effective to form one or more componentized layer, and:

stacking said one or more componentized layer in a reel-to-reel process to form said sandwich.

18. The method according to claim 11, further comprising:

pre-forming elements associated with certain layers in a reel-to-reel operation effective to form one or more componentized layer, and:

stacking discrete lengths of said one or more componentized layer to form said sandwich.

19. The method according to claim 18, further comprising:

applying a discrete substrate to said second channel layer.

20. The method according to claim 1, further comprising:

forming circuit-forming contacts, as electrically communicating extensions of individual ones of said electrodes, on both sides of said substrate.

* * * * *